United States Patent [19]

Kolombos et al.

[11] 4,111,793

[45] Sep. 5, 1978

[54] OLEFINS PRODUCTION

[75] Inventors: Alexander John Kolombos, Sutton; Donald McNeice, Reigate; Dennis Charles Wood, Sunbury, all of England

[73] Assignee: The British Petroleum Company Limited, London, England

[21] Appl. No.: 722,552

[22] Filed: Sep. 13, 1976

[30] Foreign Application Priority Data

Sep. 25, 1975 [GB] United Kingdom ............... 39284/75

[51] Int. Cl.² .......................... C07C 3/20; C10G 11/04
[52] U.S. Cl. .................................... 208/121; 252/471; 260/683 R
[58] Field of Search ............................... 208/121, 130; 260/683 R

[56] References Cited

U.S. PATENT DOCUMENTS

| 2,611,789 | 9/1952 | Good et al. | 260/683 R |
| 3,541,179 | 11/1970 | Okagami et al. | 260/683 R |
| 3,575,848 | 4/1971 | Miale | 208/121 |
| 3,647,682 | 3/1972 | Rabo et al. | 260/683 R |
| 3,725,495 | 4/1977 | Wrisberg et al. | 208/122 |
| 3,781,195 | 12/1973 | Davis et al. | 260/683 R |

*Primary Examiner*—Herbert Levine
*Attorney, Agent, or Firm*—Brooks, Haidt, Haffner & Delahunty

[57] ABSTRACT

This invention relates to a method of producing olefins from a wax distillate feed by cracking the feed in the presence of steam at a catalyst temperature of between 650° and 900° C over a manganese catalyst.

10 Claims, No Drawings

OLEFINS PRODUCTION

The present invention relates to a method of producing olefins by catalytic cracking of high boiling hydrocarbon feedstock.

Low molecular weight olefins, such as ethylene and propylene, are very useful raw material for the chemical inudstry. Conventionally, such olefins have been produced from low boiling hydrocarbons feedstock by thermal cracking at temperatures between 500° and 1,000° C. Hydrocarbon feedstocks which have been converted to olefins in this manner range from those containing lower paraffinic hydrocarbons such as naphtha boiling up to about 200° C and gas oils boiling above this range up to 350° C, to wax distillates boiling between 300° and 550° C.

It has now been found that by using a suitable catalyst in a fixed bed process the yield of the desired olefins from wax distillates can be improved.

Accordingly, the present invention is a process for producing olefins by cracking at elevated temperature in the presence of steam a hydrocarbon feedstock consisting essentially of wax distillate and boiling between 300°–550° C over a catalyst comprising a compound of manganese.

The manganese compound is preferably manganese dioxide although other manganese compounds may be envisaged. The manganese compound is suitably supported on a refractory oxide such as zirconia, titania, silica or alumina although zirconia and titania are preferred as supports. The catalyst is prepared by impregnating the support with a soluble manganese compound such as manganese nitrate, followed by heating to convert the nitrate to the oxide. The supported catalyst suitably contains between 1 and 20%, preferably between 5 and 15% by weight of manganese.

The catalyst may either be in the form of a fixed or a fluidised bed. The catalyst in the reactor is suitably maintained at a temperature between 650° and 900° C, preferably below 870° at the time of cracking.

The mixing of steam and hydrocarbon may be achieved either by introducing them pre-mixed into the reactor tubes containing the catalyst for fixed bed operations or they may be introduced separately but simultaneously for fluid bed operations either in parallel or in counter current fashion onto the catalyst bed. Where the hydrocarbon and steam are pre-mixed, they are preferably pre-heated to a temperature of about 450°–550° C at the inlet of the catalyst tubes.

The weight ratio of steam to hydrocarbon would depend upon the nature of the hydrocarbon but for wax distillate it is preferably between 1:1 and 2:1.

The steam cracking may be carried out at atmospheric or super atmospheric pressures.

The invention is further illustrated with reference to the following Examples.

EXAMPLES

EXAMPLE 1

$MnO_2/TiO_2$ 136g manganese nitrate solution (50% w/w solution as $Mn(NO_3)_2, 6H_2O$) were added to 206g titanium dioxide and 150 ml. distilled water to form a white slurry. The slurry was evaporated to dryness over a hot plate, then finally oven dried at 120° C. The catalyst was then heated at 400° C for 2 hours to decompose the nitrate to the oxide, and finally for a further 2 hours at 600° C. The catalyst was broken down to between BSS mesh 25–60 for use in the fluid bed.

EXAMPLE 2

$MnO_2/ZrO_2$ 66g manganese nitrate solution (50% w/w solution as $Mn(NO_3)_2, 6H_2O$) was added to 90g zirconium dioxide pellets. The mixture was evaporated to dryness over a steam bath and then dried overnight at 120° C. The catalyst was heated to 600° C in air overnight before use.

Steam Cracking

The $MnO_2/TiO_2$ and $MnO_2/ZrO_2$ catalysts were used to test the cracking of wax distillate in a fixed bed.

EXAMPLE 3

15g $MnO_2/TiO_2$ catalyst occupying about 18 ml. was charged to a quartz reactor. Kuwait wax distillate (1 ml./min) and steam (generated from water pumped at 1 ml./min) were passed over the catalyst for 2 hours at a maximum reactor temperature maintained at 860° C. Analysis at the major reaction products is given in Table 1.

TABLE 1

| Catalyst | 9% $MnO_2/TiO_2$ |
|---|---|
| Reactor | Fixed bed |
| Steam hydrocarbon wt.ratio | 1.0:1.0 |
| Products | (% wt on feed) |
| Hydrogen | 1.1 |
| Methane | 11.4 |
| Ethylene | 20.1 |
| Ethane | 1.9 |
| Propylene | 7.1 |
| Butadiene | 3.0 |
| Other $C_4$'s | 2.1 |
| $C_5$ + liquid products | 45.0 |
| $CO_2$ | 1.2 |

EXAMPLE 4

32g $MnO_2/ZrO_2$ occupying 18 ml. were packed into a quartz reactor. Kuwait wax distillate (1 ml./min) and steam (generated from water pumped at 1 ml./min) were passed over the catalyst for 2 hours at a maximum reactor temperature maintained at 827° C. Analysis of major reaction products is given in Table 2.

TABLE 2

| Catalyst | 10% $MnO_2/ZrO_2$ |
|---|---|
| Reactor | Fixed Bed |
| Steam:Hydrocarbon wt.ratio | 1.0:1.0 |
| Products | (% wt on feed) |
| Hydrogen | 1.0 |
| Methane | 8.0 |
| Ethylene | 23.3 |
| Ethane | 2.0 |
| Propylene | 10.0 |
| Butadiene | 4.8 |
| Other $C_4$'s | 2.5 |
| $C_5$ + liquid products | 37.5 |
| $CO_2$ | 2.1 |

EXAMPLE 5

The steam cracking was carried out by placing $MnO_2/TiO_2$ (75g) catalyst charge in the body of a quartz bed reactor and partially fluidising the bed with steam, which was preheated to between 800° and 1000° C and then passed up through a sintered distributor plate. Kuwait wax distillate (1 ml./min) was dropped vertically onto the fluidised catalyst bed controlling the temperature of the hydrocarbon at its injection point between 250° and 300° C by adjusting the nozzle injection position relative to the catalyst bed. After 1 hour a sample of the reaction products was taken and analysed (Table 3).

TABLE 3

| Catalyst | 9% $MnO_2/TiO_2$ |
|---|---|
| Reactor | Moving bed |
| Steam hydrocarbon wt.ratio | 1.1:1.0 |
| Products | (% wt on feed) |
| Hydrogen | 1.4 |
| Methane | 11.9 |
| Ethylene | 16.6 |
| Ethane | 2.6 |
| Propylene | 7.6 |
| Butadiene | 2.2 |
| Other $C_4$'s | 2.0 |
| $C_5$ + liquid products | 54.1 |
| CO | 0.1 |
| $CO_2$ | 7.7 |

We claim:

1. A process of producing olefins by cracking at elevated temperature in the presence of steam a hydrocarbon feedstock consisting essentially of wax distillate and boiling between 300° and 550° C over a catalyst composition consisting essentially of a manganese oxide and zirconia or titania.

2. A process according to claim 1 wherein the manganese compound is manganese dioxide.

3. A process according to claim 1 wherein the catalyst contains between 1 and 20% by weight of manganese.

4. A process according to claim 1 wherein the catalyst is maintained as a fixed bed.

5. A process according to claim 1 wherein the catalyst is maintained as a fluidised bed.

6. A process according to claim 5 wherein the cracking is carried out by bringing the steam and hydrocarbon feedstock into contact with the catalyst bed from substantially opposite directions.

7. A process according to claim 6 wherein the hydrocarbon feedstock is brought into contact with the catalyst bed under force of gravity.

8. A process according to claim 1 wherein the steam and hydrocarbons are premixed and preheated prior to contact with the catalyst.

9. A process as defined in claim 1 wherein said catalyst composition consists essentially of a manganese oxide and zirconia.

10. A process as defined in claim 1 wherein said catalyst composition consists essentially of a manganese oxide and titania.

* * * * *

UNITED STATES PATENT AND TRADEMARK OFFICE
CERTIFICATE OF CORRECTION

PATENT NO. : 4,111,793
DATED : 9/5/78
INVENTOR(S) : Alexander John Kolombos, Donald McNeice, and Dennis Charles Wood It is certified that error appears in the above-identified patent and that said Letters Patent are hereby corrected as shown below:

Title page, in the "Abstract", last line, delete "manganese" and after "catalyst", insert --composition consisting essentially of a manganese oxide and zirconia or titania.--

Signed and Sealed this

Third Day of April 1979

[SEAL]

Attest:

RUTH C. MASON
Attesting Officer

DONALD W. BANNER
Commissioner of Patents and Trademarks